C. H. DRAPER AND J. NORTHROP.
AUTOMATIC LOOM.
APPLICATION FILED APR. 28, 1917.
1,320,608.
Patented Nov. 4, 1919.
5 SHEETS—SHEET 3.
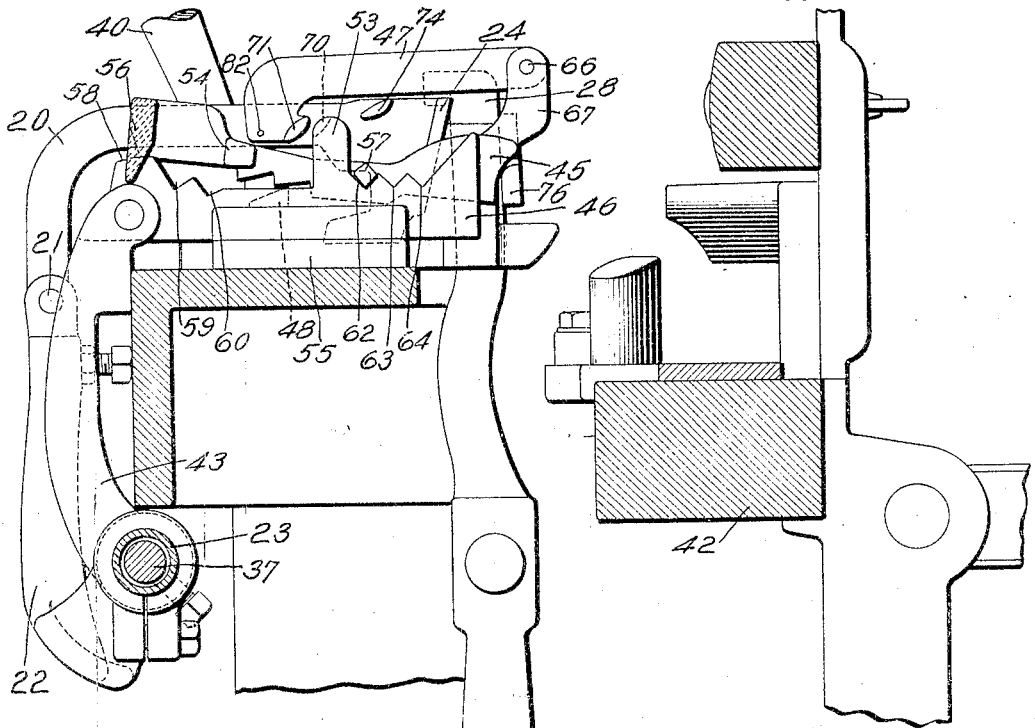
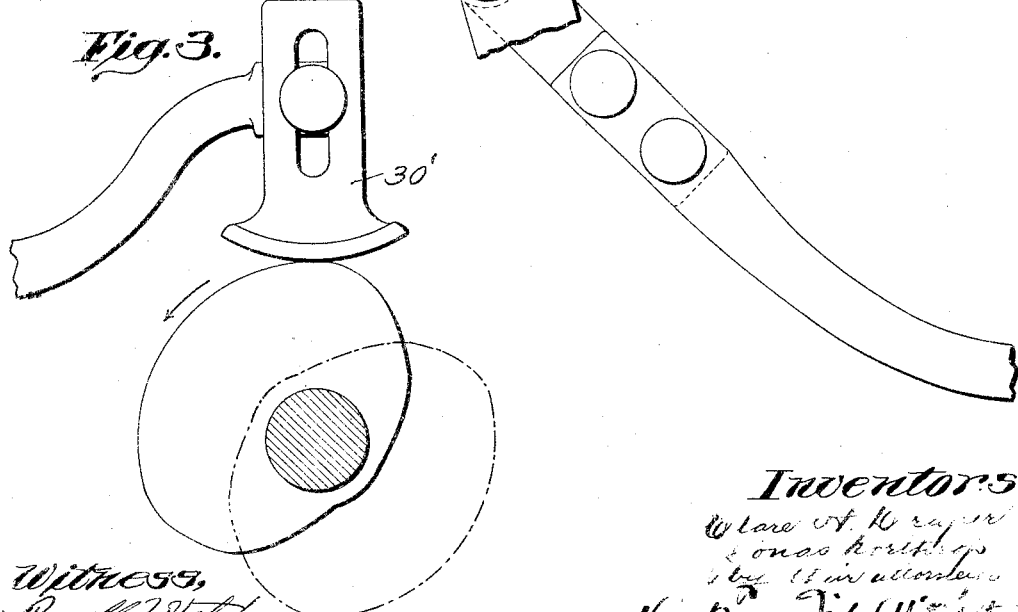

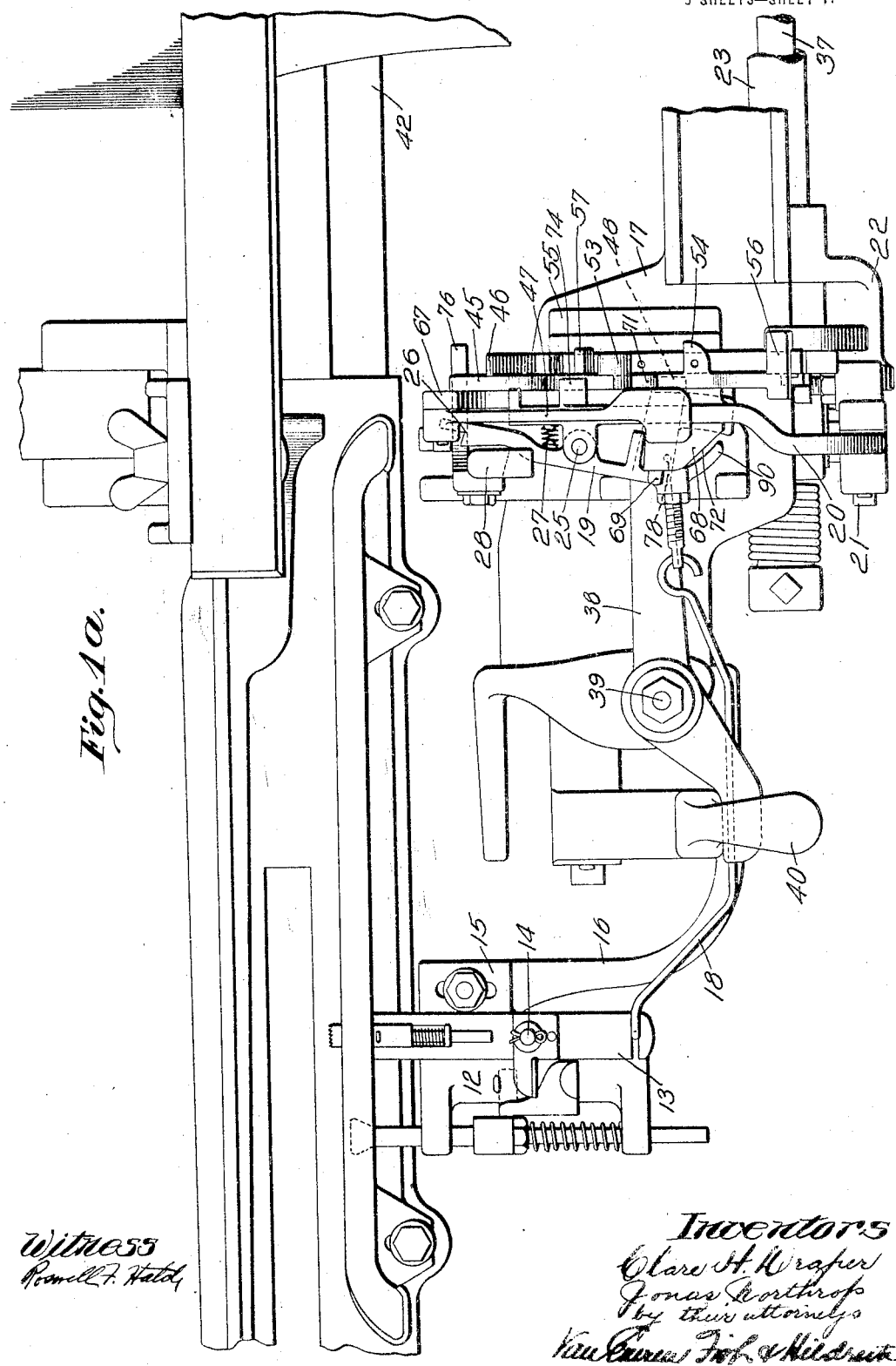

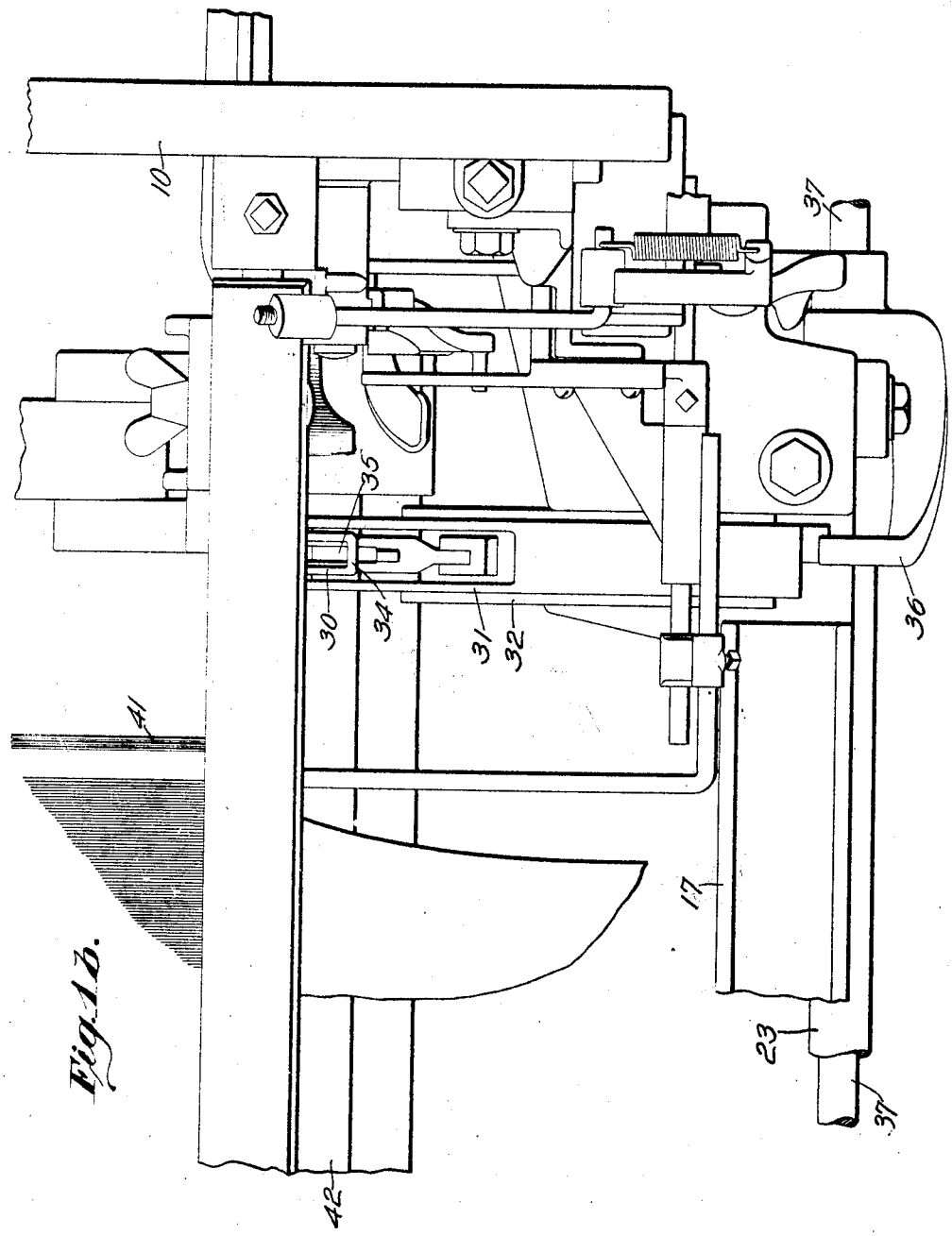

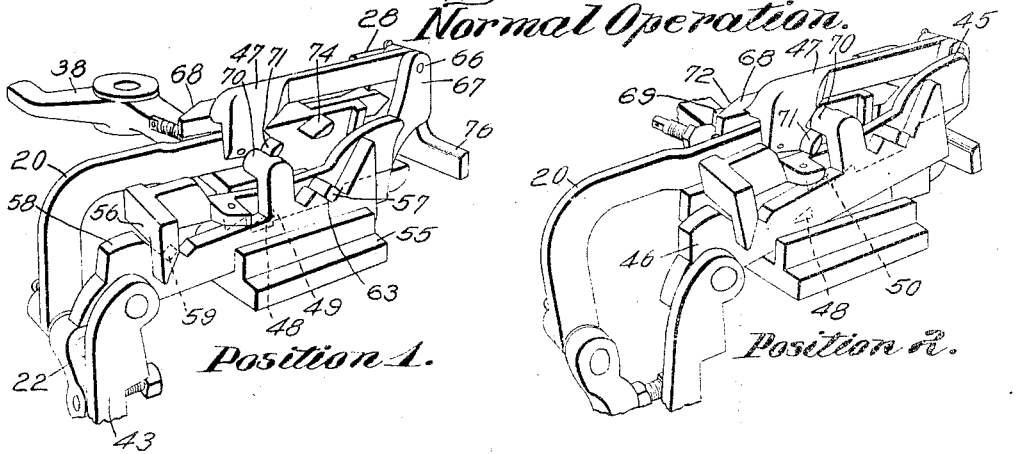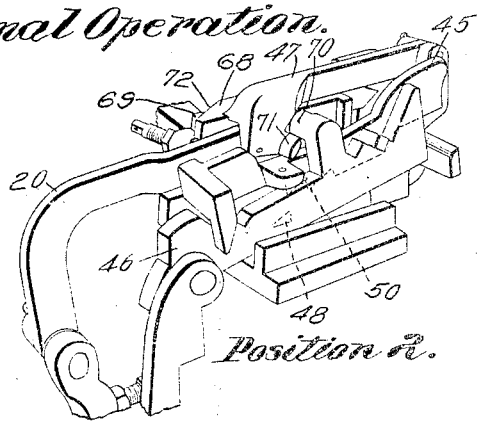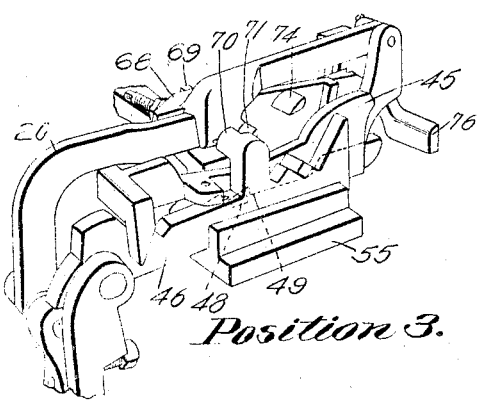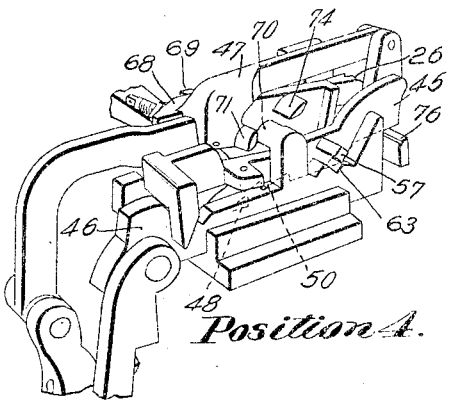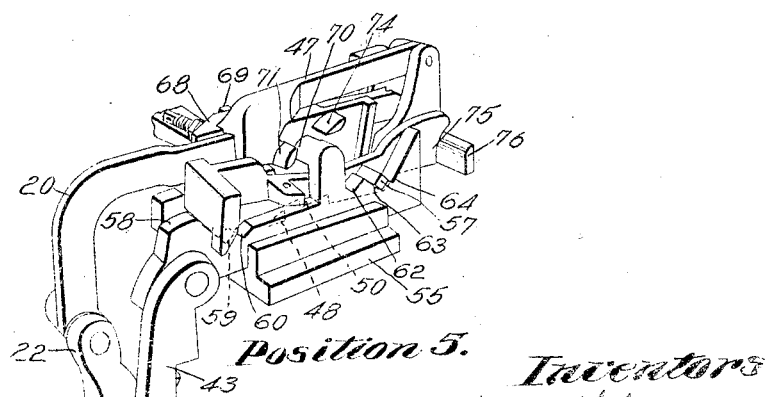

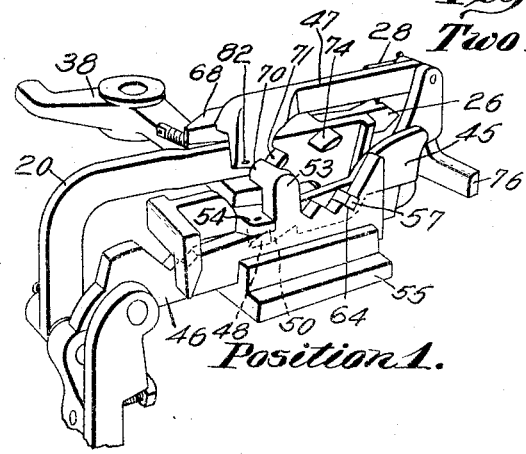
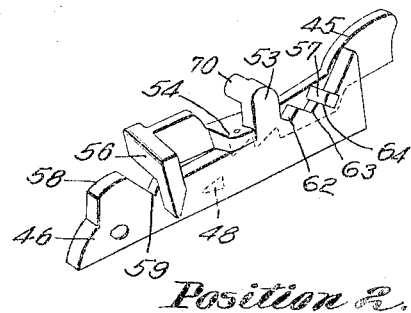
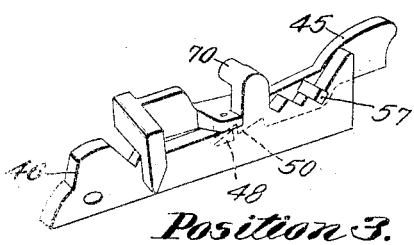
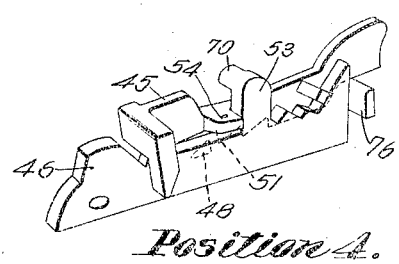
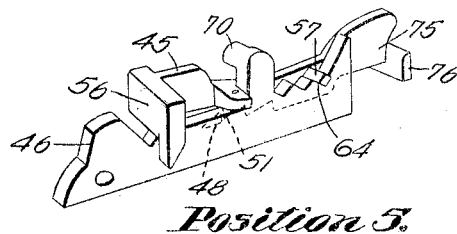
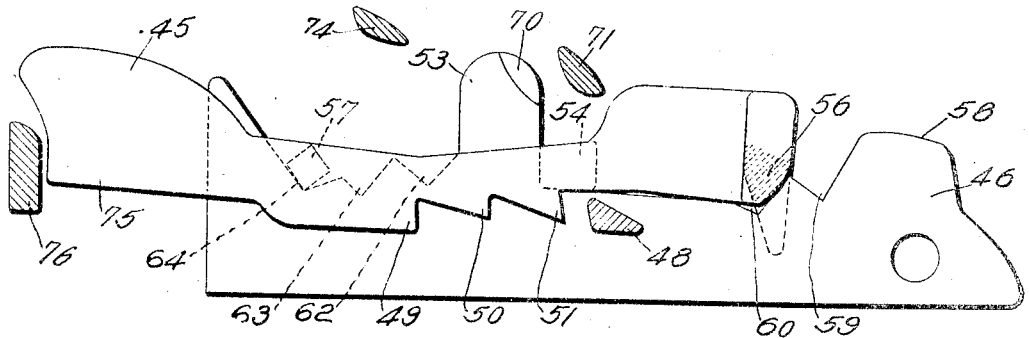

UNITED STATES PATENT OFFICE.

CLARE H. DRAPER AND JONAS NORTHROP, OF HOPEDALE, MASSACHUSETTS, ASSIGNORS TO HOPEDALE MANUFACTURING COMPANY, OF MILFORD, MASSACHUSETTS, A CORPORATION OF MASSACHUSETTS.

AUTOMATIC LOOM.

1,320,608.      Specification of Letters Patent.      Patented Nov. 4, 1919.

Application filed April 28, 1917. Serial No. 165,099.

*To all whom it may concern:*

Be it known that we, CLARE H. DRAPER and JONAS NORTHROP, citizens of the United States, residing at Hopedale, in the county of Worcester and Commonwealth of Massachusetts, have invented certain new and useful Improvements in Automatic Looms; and we do hereby declare the following to be a full, clear, and exact description of the invention, such as will enable others skilled in the art to which it appertains to make and use the same.

The present invention relates to an improvement in automatic weft replenishing looms.

The weft replenishing operation of an automatic loom is generally initiated either by a filling feeler mechanism or by a filling detector mechanism. A filling feeler mechanism acts to initiate the weft replenishing operation when the filling in the active shuttle has been unwound or exhausted to a predetermined extent. Looms controlled by filling feeler mechanisms are commonly called "feeler" looms. A filling detector mechanism acts to initiate the weft replenishing operation upon the breakage or upon the complete exhaustion of the filling. Where it is desired to weave high grade fabrics on automatic weft replenishing looms, a filling feeler mechanism is employed to initiate the replenishing operation in order to obviate the presence of mispicks, which are short wefts, and consequently are a blemish in the cloth. Where, however, an automatic loom is employed for the sake of weaving a greater quantity of cloth, but of lower grade, the replenishing operation is initiated by a filling detector mechanism.

In that type of feeler loom in which the weft replenishing mechanism is located on one side of the loom and the filling feeler mechanism is located on the opposite side of the loom, the filling detector mechanism, (provided on a feeler loom for the purpose of stopping the loom in the event of filling breakage or filling exhaustion), should be located on the replenishing side of the loom if the best results are to be obtained. The location of the filling detector mechanism on the replenishing side of a feeler loom is essential to obviate mispicks resulting either from an improper filling feeler action or from a trailing filling end. If the filling feeler mechanism fails to indicate critical exhaustion of filling at the proper time, the filling may completely exhaust before the shuttle reaches the replenishing side of the loom. This is liable to result in a mispick, which would not be detected if the detector mechanism were located beside the feeler mechanism. A trailing filling end may be present in a feeler loom for one of two reasons, either because the filling breaks at some distance from the shuttle, or because the thread parter mechanism, (with which feeler looms are provided to sever relatively near the shuttle the filling extending from the fell to the outgoing critically exhausted bobbin), operates to sever this filling end when the replenishing operation has been initiated and its completion prevented by the improper boxing of the shuttle. A trailing filling end resulting from either cause may be long enough to extend from the shuttle eye into the shed when the shuttle is boxed at the filling feeler side of the loom. This is because the shuttle eye is nearer the selvage when the shuttle is boxed at this side of the loom than when it is boxed at the replenishing side of the loom. It is readily seen, therefore, that if the filling detector mechanism were located at the filling feeler side of the loom, and a trailing filling end were caught in the shed, the filling fork would be tilted as by a complete filling, and a mispick would result.

It is frequently desirable to control the weft replenishing operation of the same automatic loom both by a filling feeler mechanism and by a filling detector mechanism, the control of the replenishing mechanism at any given time depending on the nature of the goods to be woven. Usually only one of the mechanisms will be in operation at one time, for controlling the weft replenishing mechanism, that is to say, if a high grade fabric is to be woven, the filling detector mechanism will be operatively disconnected from the replenishing mechanism; whereas, if a lower grade of fabric is to be woven, the filling feeler mechanism will be disconnected therefrom.

When the replenishing operation is controlled by a filling detector mechanism, a misthreading device is preferably provided to act in conjunction with the detector mechanism. It is the function of a misthreading device to permit the replenishing mechanism, when the shuttle does not lay filling in the shed, to attempt for a predetermined number of times to restore normal weaving conditions; and if it fails within that number of times to properly thread the shuttle, to stop the loom.

So far as is known it has not hitherto been proposed to provide a feeler loom, having the feeler mechanism on one side of the loom and the weft replenishing and filling detector mechanisms on the opposite side of the loom, with a misthreading device, and particularly in which the latter is located on the filling feeler side of the loom and controlled in its operations by the filling detector mechanism. Accordingly, one object of the present invention is to produce a misthreading device of such construction that it may be applied to a filling feeler controlled, automatic loom provided with a filling detector located on the replenishing side of the loom, so that the loom may be operated either as a feeler controlled or as a misthreading device controlled automatic loom.

Another object of the invention is to produce a misthreading device of such construction that it may be applied to a feeler loom having the filling detector mechanism located on the same side of the loom with the replenishing mechanism, and the filling feeler mechanism located on the opposite side of the loom, so that the loom may be operated either as a feeler controlled or as a misthreading device controlled loom.

Another object of the invention is to produce a misthreading device of such construction that it may be applied to the filling feeler side of a feeler loom of the type in which the filling detector mechanism is located on the replenishing side of the loom and the filling feeler mechanism is located on the opposite side of the loom, so that the loom may operate either as a filling feeler controlled or as a misthreading device controlled automatic loom.

A further object of the invention is to provide an automatic loom having a single filling detector mechanism, and that located on the weft replenishing side of the loom, with a misthreading device of such construction that it will operate to cause loom stoppage on the occurrence of more than misthread.

A further object of the invention is to provide an automatic loom having a single filling detector mechanism, and that located on the weft replenishing side of the loom, with a misthreading device mechanism of such construction that it may be located on the opposite side of the loom and be controlled in its operations by the detector mechanism.

A still further object of the invention is to produce a misthreading device having provision for causing loom stoppage on the occurrence of either two real misthreads or two hopper misthreads.

To the accomplishment of the objects above set forth, and such others as shall hereinafter appear, the invention consists in the automatic loom having the improved features described in the following specification and particularly pointed out in the appended claims.

The preferred form of the invention is illustrated in the accompanying drawings, in which Figures 1ª and 1ᵇ are plan views of parts of the opposite ends of a feeler loom showing the application of the misthreading device of the present invention to the loom; Fig. 2 is a sectional view showing in side elevation the misthreading device; Fig. 3 is a detail view showing the relative positions of the actuating cams for the weft hammers; Fig. 4 is an enlarged view of the knock-off tumbler and tumbler controller of the misthreading device looking from the left in Fig. 1ª; Fig. 5 shows in perspective views the positions assumed by the various parts of the misthreading device during a normal operation of the weft replenishing mechanism; and Fig. 6 shows in perspective views the positions assumed by the various parts of the misthreading device on the occurrence of two misthreads, certain parts of the misthreading device being left out in positions 2 to 5 inclusive.

Before describing the construction and mode of operation of the misthreading device, it will conduce to a clearer understanding of the invention to premise a few general remarks concerning the arrangement and coöperative action of the various mechanisms with which the misthreading device is associated. As has been stated, one object of the invention is to produce a misthreading device which may be applied to a feeler loom in which the filling feeler mechanism is located at one side of the loom, with the weft replenishing mechanism and the filling detector mechanism located on the opposite side of the loom. Associated with the replenishing and detector mechanisms is a thread parter mechanism which operates to sever the incoming filling end at some time previous to the second forward beat of the lay after replenishment. The necessity for the operation of the thread parter mechanism at this time will be set forth later. In coöperation with the mechanisms mentioned are two weft hammers located on opposite sides of the loom; the weft hammer coöperating with the filling detector mechanism acts to stop the loom on filling absence, and the weft hammer coöperating with the filling feeler mechanism acts to initiate the weft replenishing operation. The misthreading device of the present invention then must be of such construction that when it is applied to an automatic loom having the coöperating mechanisms above enumerated, and the filling feeler mechanism is held inoperative, the loom will operate as a misthreading device controlled automatic loom; and on the other hand when the misthreading device is held inoperative and the feeler mechanism released, the loom will operate as a feeler loom. It is accordingly proposed to locate the misthreading device on the filling feeler side of the loom, although it may be otherwise located, so that it may act directly on the same latch lever through which the filling feeler mechanism causes an actuation of the weft replenishing mechanism.

We have then, a feeler loom of the type described in which the filling feeler mechanism is assumed to be held inoperative. Under such circumstances the loom may be regarded as a non-feeler loom. In this loom the misthreading device is located on one side of the loom, and on the opposite or replenishing side is a filling detector mechanism to control its movements. Bearing in mind that the function of the misthreading device is to permit the replenishing mechanism to attempt for a predetermined number of times to restore normal weaving, and that it is applied to a loom in which the weft hammer coöperating with the filling detector acted only to stop the loom when the loom operated as a feeler loom, and that the other weft hammer unconnected, operatively or otherwise, with the detector mechanism acted only to initiate the replenishing operation, that is, to lift the usual transferrer latch into the path of its bunter on the lay, it will be understood that the beat-up of the lay on which filling absence is first detected does not initiate replenishment, but that this initiation takes place on the next beat-up; consequently the replenishing operation does not take place until the second forward beat of the lay after the detection of filling absence. And inasmuch as the replenishing and detector mechanisms are located on the same side of the loom, the replenishing beat-up of the lay will also be a detecting beat. Consequently, on the second detecting beat of a series beginning with filling breakage or exhaustion during normal weaving, this detecting beat being the replenishing beat, filling will be absent and be indicated by the detector mechanism. It is obvious that the filling absence indication on the replenishing beat must be rendered ineffective, otherwise we should have two successive replenishing operations, whether or not the first was successful. And accordingly, provision is made in the misthreading device of the present invention to nullify this second filling absence indication so that no operation of the replenishing mechanism will result therefrom. And in like manner, if a misthread occurs and there is a second replenishing operation, the detection of filling absence on this detecting beat will also be nullified. It is thus seen that a series of four successive beat-ups of the lay intervenes between the first and second operations of the replenishing mechanism.

The loom shown in the illustrated embodiment of the invention is provided at one side with a weft replenishing mechanism, the hopper of which is indicated at 10, and at the opposite side with a filling feeler mechanism, generally indicated at 12. Any usual or preferred form of filling feeler mechanism may be employed. That shown in the drawings comprises a feeler member or lever 13 pivoted at 14 on a stand 15 fastened on a bracket 16 projecting outwardly from the end of the breast beam 17. The feeler lever 13 is articulated by means of a link 18 with a latch lever 19 pivotally connected with a lever 20 pivoted at 21 to an arm 22 secured to a hollow rock or change shaft 23 journaled in brackets on the front of the breast beam and connected at the other side of the loom with the weft replenishing mechanism. The rear end 24 of the lever 20 is freely supported for sliding movements. The latch lever 19 is pivoted at 25 on the rear end of the lever 20 and has a notched end 26 which, when the filling has been exhausted to a predetermined extent, is adapted to be moved by a spring 27 interposed between the latch lever and the adjacent side of the lever 20 into the path of its coöperating weft hammer 28 pivoted at 29 on the loom frame, and to be engaged thereby on the forward beat of the latter to push forward the lever 20 to oscillate the change shaft 23 and thereby initiate the weft replenishing operation.

When the loom operates as a feeler loom, as has just been described, it is usual to stop it in the event of breakage or complete exhaustion of the filling, and for this purpose in the loom of the present invention a filling detector mechanism is located on the weft replenishing side of the loom. This detector mechanism comprises a filling fork 30 pivoted in the usual manner on a detector slide 31 mounted for sliding movements in a bracket 32 secured to the breast beam. When filling is absent, the filling fork 30 is not tilted and its tail 34 remains in the path of motion of its coöperating weft hammer 35, so that the slide 31 is pushed forward; and in so doing it moves outwardly the arm 36 secured to the rock or stop shaft 37 fulcrumed at the front of the breast beam in the hollow change shaft 23, oscillating the stop shaft and, through mechanism presently to be described, causes the shipper or knock-off lever 38 pivoted at 39 to be oscillated and knock off the shipper 40, thereby stopping the loom. Coöperating with these parts is a thread parting mechanism, indicated generally at 41, which is of such construction that it operates to sever the outgoing filling end (that is, the filling end extending from the selvage to the outgoing bobbin) on the replenishing beat-up of the lay 42; and the incoming filling end (that is, the filling end extending from the hopper to the selvage) on the succeeding beat-up of the lay.

While the loom is thus operating as a feeler controlled replenishing loom, the misthreading device of the present invention is held inoperative, except to cause loom stoppage, and when the loom is to operate as a misthreading device controlled replenishing loom, the filling feeler mechanism is held inoperative and the misthreading device is put into operative connection with the latch lever 19 so as to control the movements of the replenishing mechanism through the lever 20.

The parts of the misthreading device of the present invention are adapted to be actuated by the two weft hammers before mentioned, which are located on opposite sides of the loom. The weft hammer located on the same side of the loom with the misthreading device is adapted when the notched end of the latch lever is in its path of motion, to initiate the weft replenishing operation. Incidentally, this weft hammer operates to return certain parts of the misthreading device in normal position. The weft hammer located on the replenishing side of the loom is adapted on filling absence to move the detector slide 31 forward and thereby through the arm 36, the rock shaft 37, and an arm 43, to actuate the misthreading device. This weft hammer is further adapted, on the occurrence of a predetermined number of successive filling absences, to cause the misthreading device to actuate the shipper lever to knock off the shipper and thereby stop the loom. For the sake of convenience, the weft hammer which initiates the replenishing operation will be termed the left-hand weft hammer, and the weft hammer which actuates the misthreading device on filling absence will be termed the right-hand weft hammer.

As a prerequisite to a clear understanding of the operation of the misthreading device and its effect upon the loom operation, it will be necessary to consider the movements of the lay with relation to the movements of the two weft hammers. When the shuttle has made a flight across the lay, the lay moves forward so that the reed may engage the filling left in the shed by the shuttle and beat it up against the fell of the woven cloth. While the lay is substantially on its front center, supposing the shuttle to have been boxed at the right-hand side of the loom, the right-hand weft hammer will begin its forward movement, and if filling has been laid in the shed by the shuttle, the filling fork will be tilted and the right-hand weft hammer will move forward without coöperating with the filling fork. While the right-hand weft hammer is moving forward, the left-hand weft hammer is moving rearwardly, and by the time these weft hammers have reached the limit of their respective movements, the lay has again beaten backward to permit the shuttle to be picked to the opposite side of the loom. The lay will then move forward again, and when it is substantially on its forward center, the right-hand weft hammer will begin its rearward movement and the left-hand weft hammer will begin its forward movement. It will be observed that while the lay is beating forward, both weft hammers remain practically quiescent. The weft hammers are caused to move thus alternately with each other, and in their timed relation with the movements of the lay by the relative positions of their respective actuating cams. The actuating cam for the left-hand weft hammer is shown in full lines in Fig. 3, and the actuating cam for the right-hand weft hammer is shown in the dot and dash lines. Cam followers 30' connect the weft hammers with their respective actuating cams.

The misthreading device of the present invention operates to cause loom stoppage on the occurrence either of two hopper misthreads or two real misthreads. A hopper misthread occurs during the weft replenishing operation, and results in an absence of filling on the first flight of the shuttle away from the replenishing mechanism. A real misthread occurs by reason of the filling failing to enter the shuttle eye, and results in intact filling being laid in the shed on the first flight of the shuttle away from the replenishing mechanism, and in an absence of filling in the shed on the first return flight of the shuttle to the replenishing side of the loom. Inasmuch as the filling detector mechanism in the loom of the present invention is located on the replenishing side of the loom, it will be observed that the absence of filling resulting from a hopper misthread is not detected until the second forward beat of the lay after replenishment; and in like manner the absence of filling resulting from a real misthread is also detected on the second forward beat of the lay after replenishment. Consequently, so far as the detection of filling absence resulting from misthreads is concerned, a hopper misthread shows the same symptoms as a real misthread, and, accordingly, it will not be necessary throughout the descriptive portion of the specification to distinguish between the two kinds of misthreads, but it will be sufficient for a clear understanding of the operation of the misthreading device to designate them both by the term "misthread".

The improved misthreading device comprises in general a knock-off member or tumbler 45, a knock-off tumbler controller 46, and a latch lever controller 47. The knock-off member or tumbler 45 is adapted to be brought into engagement with the end 48 of the knock-off lever 38 to knock off the shipper on the occurrence of either two hopper misthreads, or two real misthreads, or on the occurrence of one hopper misthread and one real misthread, or vice versa. In other words, the knock-off tumbler is adapted to actuate the knock-off lever on the occurrence of two misthreads. An enlarged view of the knock-off tumbler is shown in Fig. 4. It is provided on its under side with a series of knock-off lever engaging teeth 49, 50 and 51. When either of the teeth 49 or 50 engages the knock-off lever, an actuation of the tumbler cannot result in an actuation of the knock-off lever. But when the tooth 51 is in engagement with the knock-off lever, and the tumbler is moved forward by the tumbler controller, the knock-off lever is actuated and the loom is stopped. The knock-off tumbler is adapted to be controlled in its movements by the tumbler controller 46, an enlarged view of which is shown in Fig. 4. The tumbler controller 46 is provided with a straight under part, and is loosely mounted for sliding movements in a groove in a bracket 55 secured to the breast beam. The tumbler controller 46 is pivotally connected at its forward end with the upper end of the arm 43 secured to the stop shaft 37, the oscillatory movements of which are imparted to it by the filling detector mechanism through the arm 36. When on the occurrence of an effective filling absence, that is, the first of every two successive filling absences, the detector slide 31 is moved forward, thereby oscillating the rock shaft 37, the arm 43 is moved to the left, viewing Fig. 2, and the tumbler controller is moved outwardly, carrying with it the knock-off tumbler until one of the teeth 49, 50 or 51 strikes the end of the knock-off lever. If either the tooth 49 or the tooth 50 is in engagement with the end 48 of the knock-off lever, the tumbler is held thereby and the tumbler controller completes its forward movement alone. But when the tooth 51 of the tumbler is in engagement with the end of the knock-off lever, and the tumbler is moved forward, which is the case on the occurrence of two misthreads, the tumbler is carried forward by the tumbler controller and actuates the knock-off lever. For the purpose of carrying the tumbler forward far enough to actuate the knock-off lever, the tumbler controller is provided with an upright 53 which engages a knock-off lug 54 projecting laterally from the tumbler. Until the predetermined number of misthreads have occurred, the position of the tumbler relatively to the tumbler controller is such that the upright 53 does not engage the knock-off lug; but when the requisite number of misthreads have occurred, the position of the tumbler relatively to the tumbler controller is such that the knock-off lug presses against the forward side of the upright 53, and the tumbler may be moved forward by the tumbler controller without relative movement thereto.

The knock-off tumbler is held in operative engagement with the tumbler controller by its weight alone, so that it may move longitudinally and vertically relatively thereto, and for this purpose it is provided with two bearing lugs 56 and 57 which are sharp angled on their under sides. The bearing lug 56 is adapted to rest either on the surface 58 on the forward end of the tumbler controller, or in the notches 59 and 60, while the bearing lug 57 is adapted to rest in the notches 62, 63 or 64. During normal operation of the loom, when the parts of the misthreading device are in normal position, the bearing lug 56 rests on the surface 58 and the bearing lug 57 rests in the notch 62, as shown in Fig. 2. When a single effective filling absence has occurred, due either to filling breakage or complete exhaustion of the filling during normal weaving, the lug 56 is received in the notch 59, while the lug 57 is received in the notch 63, as shown in position 1 of Fig. 5. When a single misthread has occurred, which is the second effective filling absence, the lug 56 occupies the notch 60 while the lug 57 occupies the notch 64 as shown in position 1 of Fig. 6. At this time the knock-off lug 54 presses against the upright 53, so that on the occurrence of a second misthread or third successive effective filling absence, the loom may be stopped.

The latch lever controller 47 is pivotally mounted at 66 on an upright projection 67 rising from the rear end of the bracket 55, and extends forwardly with its free end normally resting on the upper surface of the lever 20. It is the function of the latch lever controller to hold the latch lever in inoperative position during normal weaving and to permit it to swing into operative position in the path of the left-hand weft hammer on the indication of first filling absence, or on the indication of a misthread. For the purpose of holding the latch lever in inoperative position during normal weaving, the forward end of the latch lever controller flares laterally outwardly at 68, as shown in Fig. 1ª, and the edge of this head 68 is adapted to engage with a stop lug 69 rising from the forward end of the latch lever. When on the forward movement of the tumbler controller 46, due to the forward movement of the detector slide 31 on the indication of effective filling absence, the upper surface of a cam lug 70 projecting from the upright 53 laterally toward the latch lever controller, comes into engagement with the under surface of a lug 71 projecting from the forward end of the latch lever controller laterally toward the upright 53, it thereby lifts the forward end of the latch lever controller. This upward movement of the latch lever controller disengages the head 68 from the stop lug 69 on the forward end of the latch lever and permits the spring 27 to force the notched end of the latch lever into the path of motion of the left-hand weft hammer. As the left-hand weft hammer beats forward in engagement with the latch lever, thereby pushing forward the lever 20, as before described, the stop lug 69 passes forward from under the head 68. Whereupon the forward end of the latch lever controller descends by gravity until it rests in normal position on the lever 20, with the head 68 at the rear of the stop lug, as shown in position 2 of Fig. 5. Then as the left-hand weft hammer moves backwardly, and the spring actuated lever 20 is free to return to normal position, the rearward movement of the latch lever presses the stop lug against a cam surface 72 on the forward end of the head 68, thereby causing the latch lever to swing on its pivot, and the notched end thereof to assume its normal position out of the path of the left-hand weft hammer.

The structure and functions of the knock-off tumbler, the tumbler controller, and the latch lever controller have been described with sufficient fullness for an understanding of the operation of the misthreading device. The function of such parts as have not yet been described will be pointed out in the following description of the operation of the misthreading device during a normal operation of the weft replenishing mechanism, and during the occurrence of one and of two misthreads. A normal operation of the replenishing mechanism takes place when the filling breaks during normal weaving, or is completely exhausted, and the weft replenishing mechanism by a single operation restores the loom to normal weaving conditions. A single misthread takes place when the weft replenishing mechanism attempts once to restore normal weaving conditions and fails because of either a hopper misthread or a real misthread. Two misthreads take place when the replenishing mechanism attempts twice to restore normal weaving conditions and fails because of hopper misthreads or real misthreads, or because of a combination of the two. If, following a single misthread the shuttle is properly threaded, normal weaving conditions are resumed; but if two misthreads occur in succession, the loom is stopped.

The operation of the misthreading device during a normal operation of the weft replenishing mechanism will be described in connection with Fig. 5 only, which shows the various positions assumed by the parts of the misthreading device on the successive forward beats of the lay. It is assumed that during normal weaving the thread breaks or is completely exhausted, on the flight of the shuttle toward the replenishing mechanism. If the filling broke or became exhausted during the flight of the shuttle away from the replenishing mechanism, the action of the misthreading device and of the replenishing mechanism would be exactly the same as when the thread gives out on the flight of the shuttle toward the replenishing mechanism; so, for the sake of convenience of description, the thread breakage or exhaustion will be assumed to take place on the flight of the shuttle toward the replenishing mechanism. With the filling absent on the beat-up of the lay succeeding the flight of the shuttle, the filling fork will not be tilted, and on the corresponding forward movement of the right-hand weft hammer the coöperation between the weft hammer and the tail of the filling fork will cause the detector slide to be moved forward and the stop shaft to be oscillated, which will result in the forward movement of the tumbler controller. The position of the parts of the misthreading device at the time the right-hand weft hammer is at the limit of its forward movement is shown in position 1.

While the tumbler controller was moving forward, the upper surface of the lug 70 passed under the latch controlling lug 71, and raised the forward end of the latch lever controller, thereby permitting the notched end of the latch lever to assume its operative position in the path of the left-hand weft hammer; and also while the tumbler controller was moving forward, the engagement of the tooth 49 on the under side of the tumbler with the end 48 of the shipper lever held the tumbler from moving forward, so that as the tumbler controller was moved outwardly by the arm 43, the bearing lug 56 was received into the notch 59 and the bearing lug 57 was received into the notch 63. While the right-hand weft hammer was moving forward, and during the time it continued at rest at the limit of its forward movement, the lay had returned and once more beat up. The right-hand weft hammer now begins its rearward movement, and the left-hand weft hammer now begins its forward movement, while the lay retreats so that the shuttle may be picked to the weft replenishing side of the loom. During this forward movement of the left-hand weft hammer, it engages the operatively positioned latch lever and pushes forward the lever 20 to oscillate the hollow rock shaft 23 to position the transferrer latch in the path of its bunter, so that, as the lay beats up on the succeeding or replenishing beat, a filled bobbin may be inserted in the shuttle. While the left-hand weft hammer was moving forward, the right-hand weft hammer was moving rearwardly, permitting the arm 43 to be returned to its inward position, pressing against the forward side of the breast beam. When the tumbler controller moved forward and the lug 70 by its engagement with the lug 71 lifted the forward end of the latch lever controller, the extent of the forward movement of the tumbler controller was such that after the lug 70 thereon had lifted the forward end of the latch lever controller by its engagement with the lug 71, it assumed a position on the front side of the lug 71, so that now as the tumbler controller is moved rearwardly by the arm 43, the under surface of the lug 70 is brought into engagement with the upper surface of the lug 71. The engagement of the two lugs during the rearward movement of the tumbler controller causes the rearward end of the tumbler controller to be lifted out of its guiding slot, as shown in position 2.

After passing over the lug 71, the lug 70 passes on to the upper surface of a lug 74 projecting laterally toward the tumbler controller from the rearward end of the lever 20. This lug 74 on the rearward end of the lever 20 is for the purpose of preventing the tumbler from descending into its normal position at this time. It will be seen by reference to position 1 that while the lever 20 is in normal position, before the left-hand weft hammer has moved forward, the lug 74 is to the rear of the lug 71, and that the lowermost point of the lug 74 is in the plane of the uppermost point of the lug 71, and that, consequently, when the lever 20 has been moved forward by the left-hand weft hammer and the lug 74 has been moved into engagement with the lug 71, the two constitute a continuous surface upon which the lug 70 is adapted to slide. This arrangement of parts is provided, because it will be understood that if the tumbler controller were permitted to assume its normal position at this time with its lug 70 to the rear of the lug 71, the next forward movement of the tumbler controller would again raise the forward end of the latch lever controller and permit the latch lever to assume its operative position in the path of the left-hand weft hammer, so as thereby to effect a raising of the transferrer latch, which would result in the insertion of another filled bobbin in the shuttle before it was determined whether the previous replenishment had been properly performed, that is, whether the shuttle had been properly threaded.

We have thus far had two beat-ups of the lay, the first, on which the absence of filling was detected, during which the latch lever was operatively positioned in the path of the left-hand weft hammer, and the second, during which the latch lever was engaged by the left-hand weft hammer and moved forward to position the transferrer latch in the path of its bunter. The lay now beats forward for the third time, and during this beat-up the replenishing operation takes place and a new supply of filling is inserted in the shuttle. On this replenishing beat-up of the lay, the right-hand weft hammer again engages with the fork tail, because of filling absence, and again moves forward the detector slide to cause an oscillation of the stop rock shaft 37 and a forward movement of the tumbler controller. As the tumbler controller moves outwardly, its lug 70 slides down over the two lugs 74 and 71 so as to assume a position in front of the latch controller lug 71, as shown in position 3. While the tumbler controller was descending from the position shown in position 2 to the position shown in position 3, the tooth 50 on the tumbler passed over the end 48 of the knock-off lever and did not engage therewith, so that there was no relative movement between the tumbler and the tumbler controller. Consequently, the bearing lugs 56 and 57 still remain in the notches 59 and 63 respectively, into which notches they were received on the first outward movement of the tumbler controller. It is seen, therefore, that this second outward movement of the tumbler controller had no effect whatever upon the relative positions of the parts of the misthreading device. While the tumbler and the tumbler controller were moving outwardly, with the forward movement of the right-hand weft hammer, the left-hand weft hammer was retreating and the lever 20 was returning toward the breast beam. During this rearward movement of the lever 20, the stop lug 69 on the forward end of the latch lever was forced against the cam surface 72 of the head 68 on the forward end of the latch lever controller, and the latch lever was thereby caused to swing on its pivot and its notched end, to be forced out of the path of the left-hand weft hammer. While the parts of the misthreading device have been assuming the positions shown in position 3, the lay has retreated and the shuttle has been picked to the filling feeler side of the loom, and thereupon the lay beats forward on its fourth successive beat-up.

Upon the fourth beat-up of the lay, the right-hand weft hammer returns and the left-hand weft hammer moves forward. As the right-hand weft hammer is moving rearwardly, the tumbler controller performs a corresponding rearward movement, and the under surface of the lug 70 is forced against the upper surface of the lug 71, so that the tumbler controller with the tumbler is again raised. But it will be observed that inasmuch as the notched end of the latch lever was out of the path of motion of the left-hand weft hammer, the latter has moved forward without engaging the latch lever, and that, therefore, the lever 20 remains in normal position with its lug 74 at some distance to the rear of the latch controller lug. Consequently, after the tumbler controller lug has passed up over the latch controller lug, it drops behind the latter into the position shown in position 4. By this time the left-hand weft hammer has come forward sufficiently far, so that as the tumbler controller and the tumbler are descending, the rear end of the tumbler descends on top of a bunter 76, secured to the left-hand weft hammer. It will be observed that by reason of these movements the tooth 50 of the tumbler is positioned rearwardly of the end 48 of the knock-off lever. During this last forward movement of the left-hand weft hammer and the rearward movement of the right-hand weft hammer, the lay has beaten backward and the shuttle has been picked to the replenishing side of the loom.

The lay now moves forward on the fifth successive beat-up, and inasmuch as the assumption is that the shuttle was properly threaded during the replenishing operation, the filling will be present and the filling fork will be tilted, so that there will be no coöperation between the right-hand weft hammer and the fork tail; consequently, the detector slide will remain quiescent, and so will the tumbler controller. It will be borne in mind that in order that the filling detector mechanism may indicate presence or absence of filling on this beat-up of the lay, it was necessary for the incoming filling end to have been previously severed. It is assumed that the incoming filling end was severed by the parter mechanism 41 during the first beat-up of the lay after replenishment. While the right-hand weft hammer was moving forward at the completion of the fifth beat-up of the lay, the left-hand weft hammer was performing its corresponding rearward movement. This rearward movement of the left-hand weft hammer disengaged the bunter 76 thereon from under the rear end of the tumbler, which thereupon descended until its bearing lug 57 was again received in the notch 63. The positions of the various parts of the misthreading device at the completion of these movements is shown in position 5. While these described movements have been taking place, the lay has again retreated and the shuttle has been boxed at the filling feeler side of the loom.

The lay now moves forward on its sixth successive beat-up, and then the left-hand weft hammer beats forward and the right-hand weft hammer moves rearwardly. It will be observed from an inspection of position 5 that at this time the rear end 75 of the tumbler is in the path of motion of the bunter 76. Consequently, as the bunter 76 is moved forward with the left-hand weft hammer, it strikes the rear end of the tumbler, thereby forcing the bearing lugs 56 and 57 to travel up the inclined forward surfaces of the notches 59 and 63 respectively. The range of movement of the bunter 76 is such that the tumbler is pushed forward until the front bearing lug 56 is on the surface 58 on the forward end of the tumbler controller, and the rear bearing lug 57 occupies the notch 62. While the bunter was thus resetting the tumbler, the teeth on the under side thereof did not engage with the end 48 of the knock-off lever, because of the arrangement and inclination of the forward surfaces of the notches 59 and 63. The parts of the misthreading device are now in normal position, and normal weaving conditions have been restored.

The operation of the misthreading device on the occurrence of two misthreads will be described with reference to Fig. 6 in connection with Fig. 5. The positions assumed by the misthreading device on the first four beat-ups of the lay on the occurrence of two misthreads, are identical with the positions assumed by the misthreading device on the first four beat-ups of the lay during normal replenishment. To recapitulate these movements briefly: On the first beat-up filling absence resulting from either filling breakage or from complete exhaustion was detected. The parts of the misthreading device then moved from their normal position to that shown in position 1 of Fig. 5. On the next forward beat of the lay, the parts of the misthreading device assumed the position shown in position 2 of Fig. 5. On the third successive beat-up of the lay, which is the replenishing beat-up, the parts of the misthreading device are positioned as shown in position 3 of Fig. 5. And on the next succeeding beat-up of the lay the parts of the misthreading device are positioned as shown in position 4 of Fig. 5.

The lay has now retreated and the shuttle has been picked to the replenishing side of the loom, and the lay comes forward on its fifth beat-up. It is assumed that a misthread has occurred due either to a breakage of the filling during the replenishing operation or to a breakage of the filling on the return shot of the shuttle to the replenishing side because the filling failed to enter the shuttle eye. As a result filling will be absent on this fifth beat-up of the lay, the filling fork will not be tilted and the fork tail will be engaged by the right-hand weft hammer on its corresponding forward movement. The detector slide will therefore be moved forward, and this will result in the forward movement of the tumbler controller. It will be observed by reference to position 4 of Fig. 5 that the tooth 50 on the under side of the tumbler is behind the end 48 of the knock-off lever. Consequently, when the tumbler controller is moved forward, due to the detection of filling absence, the tooth 50 will be drawn against the end 48 of the knock-off lever, and the tumbler will be held thereby while the tumbler controller completes its outward movement. Thereupon, the bearing lugs 56 and 57 will be lifted out of the notches 59 and 63 and will be received in the notches 60 and 64 respectively. While the tumbler controller was moving forward, the upper side of its lug 70 engaged with the under side of the latch controller lug 71 and lifted the forward end of the latch controller as before to permit the notched end of the latch lever to assume its operative position in the path of the left-hand weft hammer. The position of the parts at the completion of these movements is shown in position 1 of Fig. 6. The difference between the action of the misthreading device as shown in position 5 of Fig. 5 and the action of the misthreading device as shown in position 1 of Fig. 6, is due to the fact that in position 5 of Fig. 5 filling presence was indicated by the detector mechanism, and the tumbler controller remained quiescent; whereas in the latter case filling absence was detected and the tumbler controller was moved forward. In the former case, while the right-hand weft hammer was moving forward, the tumbler controller remained quiescent, so that as the left-hand weft hammer was moving rearwardly, the bearing lug 57 descended into the notch 63. In the latter case, while the left-hand weft hammer is returning, the tumbler controller is moving forward and the bearing lug 57 does not descend into the notch 63, but into the notch 64. During these movements, the lay has moved rearwardly and the shuttle has been picked to the filling feeler side of the loom.

The lay now moves forward on its sixth beat-up, and the misthreading device having operated to permit the notched end of the latch lever to move into the path of movement of the left-hand weft hammer, the latter on its corresponding forward movement engages the latch lever and thereby moves forward the lever 20 to position the transferrer latch in the path of its bunter. While the left-hand weft hammer is moving forward, the right-hand weft hammer is returning, thereby permitting the tumbler controller to move rearwardly. This rearward movement of the tumbler controller again brings the under surface of its lug 70 into engagement with the upper surface of the latch controller lug 71, so that as the tumbler controller continues its rearward movement, its lug 70 travels up the inclined surface of the lug 71. As before, the forward movement of the lever 20 brought its lug 74 immediately behind the latch controller lug so as to afford a rest for the tumbler controller lug in order to prevent the tumbler controller lug from assuming a position behind the latch controller lug. The position of the parts at the completion of these movements is shown in position 2 of Fig. 5 with the exception that the tumbler and tumbler controller occupy the relative positions shown in position 2 of Fig. 6. While these movements were taking place, the lay had retreated and the shuttle had been picked to the replenishing side of the loom.

The lay now moves forward on its seventh beat-up, which is a replenishing beat. It will be remembered that the first beat detected filling absence, that the third beat was a replenishing beat, and that the fifth beat detected the absence caused by the misthread; the seventh beat accordingly is a replenishing beat, and the filling will of course be absent, and as the right-hand weft hammer moves forward on its corresponding beat, it will engage the fork tail and move forward the detector slide, which will result in the forward movement of the tumbler controller. The tumbler controller lug will again slide down over the lugs 71 and 74 without raising the forward end of the latch lever controller; and the tumbler will pass over the end 48 of the knock-off lever without engaging therewith. While the tumbler controller was moving forwardly, synchonously with the right-hand weft hammer, the lever 20 was moving rearwardly, synchronously with the left-hand weft hammer, and consequently the stop lug on the forward end of the latch lever was again forced against the cam surface of the head 68 on the forward end of the latch lever controller and the latch lever was turned on its pivot until its notched end was moved out of the path of movement of the left-hand weft hammer. Upon the completion of these movements, the parts of the misthreading device occupy the positions shown in position 3 of Fig. 5, with the exception that the tumbler and the tumbler controller are located relatively to each other, as shown in position 3 of Fig. 6; and also with the exception that the tooth 50 of the tumbler is behind the end 48 of the knock-off lever. While these movements were taking place, the lay had retreated and the shuttle had been picked to the filling feeler side of the loom.

The lay now moves forward on the eighth successive beat-up. Substantially at the completion of this beat-up, the right-hand weft hammer retreats and the left-hand weft hammer moves forward. Synchronously with the retreat of the right-hand weft hammer the tumbler controller moves rearwardly, and as it does so the under surface of its lug 70 engages with the upper surface of the latch controller lug 71, whereby the tumber controller is caused to move upwardly. By this time the left-hand weft hammer has moved its bunter into the path of the downward movement of the rear end of the tumbler, and consequently the rear end of the tumbler is received on the upper surface of the bunter 76. Inasmuch as the latch lever was held inoperative by the head 68, the lever 20 was not moved forward. As a result the lug 74 on the rear end thereof stood fast, which permitted the tumbler controller lug to fall behind the latch controller lug, and the tumbler controller to assume its normal position. The positions of the parts upon the completion of these movements is as shown in position 4 of Fig. 5, except that the tumbler and tumbler controller are related as shown in position 4 of Fig. 6. It will be observed that at this time the tooth 51 is behind the end 48 of the knock-off lever and that the knock-off lug 54 presses against the front side of the upright 53. While these movements were taking place, the lay had retreated and the shuttle had been picked to the replenishing side of the loom. It is assumed that during the second replenishing operation another misthread occurred, that is, either the thread broke during the replenishing operation, or else the thread did not properly enter the shuttle eye and was broken on the flight of the shuttle toward the replenishing side. Consequently, the filling will be absent on the next detecting beat.

The lay now moves forward on its ninth successive beat-up, and on the assumption that filling is absent, the right-hand weft hammer on its corresponding forward movement will engage with the fork tail and move forward the detector slide, and consequently the tumbler controller. The forward movement of the tumbler controller forces the upright 53 against the knock-off lug of the tumbler, which forces the tooth 51 of the knock-off tumbler against the end 48 of the knock-off lever, causing the knock-off lever to be oscillated so as to disengage the shipper from its holding notch and stop the loom. While the tumbler controller was moving forward, the upper surface of its lug 70 engaged with the under surface of the latch controller lug 71 and raised the forward end of the latch controller, thereby permitting the notched end of the latch lever to assume its operative position in the path of the left-hand weft hammer.

The operator will now ascertain what is wrong with the loom; and inasmuch as there is a filled bobbin in the shuttle, before he starts up the loom again, he will usually catch the end of the filling in the temple. It will not be necessary, therefore, to have a replenishing operation, and accordingly the notched end of the latch lever must be moved into inoperative position. For this purpose a pin 78 rises vertically from the knock-off lever, and as this end of the knock-off lever is moved outwardly by the engagement of the knock-off tumbler therewith, the pin 78 is brought into engagement with a cam lug 90 projecting from the forward end of the latch lever into the path of motion of the pin 78. The outward movement of this pin in engagement with the lug 90 causes the latch lever to be swung on its pivot, so as to permit the head 68 on the forward end of the latch lever to descend to engage with the stop lug and hold the latch lever in inoperative position. The loom will now be started without a replenishing operation taking place until the filling is again broken or completely exhausted. By reason of the coöperative action between the pin 78 and cam lug 90, so long as the shipper is off, the loom can be freely turned by hand without an operation of the replenishing mechanism. This is of special advantage in matching picks when the loom is operating as a feeler loom only.

The operation of the misthreading device permitting the loom to run, if after the occurrence of one misthread the replenishing mechanism succeeds in properly threading the shuttle, will be readily understood from a consideration of position 4 of Fig. 6 in connection with position 4 of Fig. 5. It will be observed that position 4 of Fig. 6 represents the position of the parts after the lay has moved forward on its eighth beat. If it be assumed that during the second replenishing operation the shuttle was properly threaded, the succeeding or ninth beat-up of the lay would therefore find filling present, and consequently the right-hand weft hammer would not coöperate with the fork tail, and the detector slide and the tumbler controller would remain quiescent. It will be further observed that the positions of the parts of the misthreading device at this time (at the completion of the ninth beat-up)

would correspond exactly to the positions of the parts shown in position 5 of Fig. 5, except that the bearing lugs 56 and 57 would occupy the notches 60 and 64 respectively rather than the notches 59 and 63. During these movements the lay would have moved rearwardly and the shuttle would have been picked to the filling feeler side of the loom, and on its next forward movement and the corresponding forward movement of the left-hand weft hammer, the bunter 76 thereon would engage with the rear end of the knock-off tumbler and return it to its normal position (as will clearly appear from a consideration of Fig. 4), in exactly the same manner in which it is returned to normal position, as described in connection with the operation of the misthreading device during normal operation of the weft replenishing mechanism.

It is thus seen that when normal replenishment takes place, the parts of the misthreading device are returned to normal position in six beats of the lay, and that when two misthreads occur, the loom is stopped on the ninth beat-up of the lay; and further, that when only one misthread occurs, the parts of the misthreading device are returned to normal position on the tenth forward beat of the lay.

It will be understood that by increasing the number of teeth on the forward under side of the knock-off tumbler and by increasing the two sets of notches on the tumbler controller correspondingly, the misthreading device may be made to effect loom stoppage on the occurrence of any predetermined number of misthreads.

When a feeler loom of the type described is provided with a misthreading device of the present invention, and the weft replenishing mechanism is to be controlled in its operation by the filling feeler mechanism alone, the misthreading device will be rendered inoperative by holding the forward end of the latch lever controller lifted by inserting a cotter pin in the hole 82 thereof, so that the head 68 on the latch lever controller will not engage with the stop lug 69 on the latch lever. The knock-off tumbler will then be moved into position so that its tooth 51 will be to the rear of the end 48 of the knock-off lever; and the bunter 76 on the left-hand weft hammer will be lowered so that it will not engage with the end 75 of the tumbler. The filling feeler mechanism having been put into operative condition, an occurrence of filling absence and a corresponding forward movement of the detector slide 31 will result as before in a forward movement of the tumbler controller, which will cause the tooth 51 of the tumbler to engage with and actuate the knock-off lever to knock off the shipper and stop the loom.

It will now be apparent from the foregoing description that the objects of the invention have been accomplished and that the following novel features of automatic loom construction have been produced: First, an automatic loom having a weft replenishing mechanism, a single filling detector mechanism, and a thread parting mechanism, all located on the same side of the loom, has been provided with a filling feeler mechanism and with a misthreading device so that the loom may operate either as a filling feeler controlled or as a misthreading device controlled automatic loom. Second, a filling feeler controlled, automatic loom having a weft replenishing mechanism, a single filling detector mechanism, and a thread parting mechanism, all located on the same side of the loom, and a filling feeler mechanism located on the opposite side of the loom, has been provided with a misthreading device so that when the filling feeler is held inoperative, the loom may operate as a misthreading device controlled, automatic loom. Third, a filling feeler controlled, automatic loom having a weft replenishing mechanism, a single filling detector mechanism, and a thread parting mechanism, all located on the same side of the loom, and the filling feeler mechanism located on the opposite side of the loom, is provided with a misthreading device located on the filling feeler side of the loom, so that when the filling feeler is held inoperative the loom may operate as a misthreading device controlled, automatic loom. Fourth, an automatic loom having a single filling detector mechanism which is located on the weft replenishing side of the loom, is provided with a misthreading device having provision whereby it will operate to cause loom stoppage on the occurrence of more than one misthread. Fifth, an automatic loom having a single filling detector mechanism which is located on the replenishing side of the loom, is provided with a misthreading device located on the opposite side of the loom, and having provision whereby it may be controlled in its operations by the detector mechanism. And sixth, a misthreading device has been produced having provision by virtue of which it will cause loom stoppage on the occurrence of either two hopper misthreads or two real misthreads; or on the occurrence of one hopper misthread and one real misthread, or vice versa.

Having thus described the invention, what is claimed as new is:—

1. An automatic loom having, in combination, a weft replenishing mechanism, a single filling detector mechanism, a thread parter mechanism, all located on one side of the loom, a filling feeler mechanism, and a misthreading device, said filling feeler mechanism and said misthreading device being constructed and arranged so that they may be separately connected with the weft replenishing mechanism so that the loom may operate either as a filling feeler controlled or as a misthreading device controlled automatic loom.

2. An automatic loom having, in combination, a weft replenishing mechanism, a single filling detector mechanism, a thread parter mechanism, all located on one side of the loom, a filling feeler mechanism located on the opposite side of the loom, and a misthreading device, said filling feeler mechanism and said misthreading device being constructed and arranged so that they may be separately connected with the weft replenishing mechanism so that the loom may operate either as a filling feeler controlled or as a misthreading device controlled automatic loom.

3. An automatic loom having, in combination, a weft replenishing mechanism, a single filling detector mechanism, a thread parter mechanism, all located on one side of the loom, a filling feeler mechanism, and a misthreading device, both located on the opposite side of the loom, said filling feeler mechanism and said misthreading device being constructed and arranged so that they may be separately connected with the weft replenishing mechanism so that the loom may operate either as a filling feeler controlled or as a misthreading device controlled automatic loom.

4. An automatic loom having, in combination, a weft replenishing mechanism, a single filling detector mechanism, both located on one side of the loom, and a misthreading device constructed and arranged to cause loom stoppage on the occurrence of more than one misthread.

5. An automatic loom having, in combination, a weft replenishing mechanism, a filling detector mechanism, both located on the same side of the loom, and a misthreading device located on the opposite side of the loom operatively connected with the filling detector mechanism and having provision whereby it will cause loom stoppage on the occurrence of a predetermined number of misthreads.

6. An automatic loom having, in combination, a weft replenishing mechanism, a filling detector mechanism, and a misthreading device constructed and arranged to cause loom stoppage on the occurrence either of two hopper misthreads or two real misthreads, or on the occurrence of one hopper misthread and one real misthread, or vice versa.

7. An automatic loom having, in combination, a weft replenishing mechanism, a single filling detector mechanism, a thread parter mechanism, all located on one side of the loom, a filling feeler mechanism, and a misthreading device, said filling feeler mechanism and misthreading device being constructed and arranged so that they may be separately connected with the weft replenishing mechanism so that the loom may operate either as a filling feeler controlled or as a misthreading device controlled automatic loom, and said misthreading device having provision for causing loom stoppage on the occurrence of either two hopper misthreads or two real misthreads, or on the occurrence of one hopper misthread and one real misthread, or vice versa.

8. An automatic loom having, in combination, a weft replenishing mechanism, a single filling detector mechanism, a thread parter mechanism, all located on one side of the loom, a filling feeler mechanism located on the opposite side of the loom, and a misthreading device, said filling feeler mechanism and said misthreading device being constructed and arranged so that they may be separately connected with the weft replenishing mechanism so that the loom may operate either as a filling feeler controlled or as a misthreading device controlled automatic loom, and said misthreading device having provision for causing loom stoppage on the occurrence of either two hopper misthreads or two real misthreads, or on the occurrence of one hopper misthread and one real misthread, or vice versa.

9. An automatic loom having, in combination, a weft replenishing mechanism, a single filling detector mechanism, a thread parter mechanism, all located on one side of the loom, a filling feeler mechanism, and a misthreading device, both located on the opposite side of the loom, said filling feeler mechanism and said misthreading device being constructed and arranged so that they may be separately connected with the weft replenishing mechanism so that the loom may operate either as a filling feeler controlled or as a misthreading device controlled automatic loom, and said misthreading device having provision for causing loom stoppage on the occurrence of either two hopper misthreads or two real misthreads, or on the occurrence of one hopper misthread and one real misthread, or vice versa.

10. An automatic loom having, in combination, a weft replenishing mechanism, a single filling detector mechanism, both located on one side of the loom, and a misthreading device constructed and arranged so that it will cause loom stoppage on the occurrence of either two hopper misthreads or two real misthreads, or on the occurrence of one hopper misthread and one real misthread, or vice versa.

11. An automatic loom having, in combination, a weft replenishing mechanism, a filling detector mechanism, both located on the same side of the loom, and a misthreading device located on the opposite side of the loom operatively connected with the filling detector mechanism and having provision whereby it will cause loom stoppage on the occurrence of either two hopper misthreads or two real misthreads, or on the occurrence of one hopper misthread and one real misthread, or vice versa.

12. An automatic loom having, in combination, a weft replenishing mechanism, a filling detector mechanism, a weft hammer coöperating therewith, a misthreading device operatively connected with the filling detector mechanism for controlling the operation of the weft replenishing mechanism, said misthreading device being constructed and arranged to cause loom stoppage on the occurrence of a predetermined number of hopper misthreads or real misthreads, and a second weft hammer for coöperation with the misthreading device to restore it to normal position on the sixth successive beat-up of the lay during a normal operation of the replenishing mechanism.

13. An automatic loom having, in combination, a weft replenishing mechanism, a filling detector mechanism, a weft hammer coöperating therewith, a thread parter mechanism, all located on one side of the loom, a misthreading device located on the opposite side of the loom and connected with the filling detector mechanism for controlling the weft replenishing mechanism, and a second weft hammer coöperating with the misthreading device to restore it to normal condition on the sixth successive beat-up of the lay during a normal operation of the weft replenishing mechanism.

14. An automatic loom having, in combination, a weft replenishing mechanism, a filling detector mechanism, a weft hammer coöperating therewith, a misthreading device connected with the filling detector mechanism for controlling the operations of the weft replenishing mechanism, and a second weft hammer coöperating with the misthreading device for restoring it to normal condition on the tenth successive beat-up of the lay on the occurrence of either a hopper misthread or a real misthread during the operation of the replenishing mechanism.

15. An automatic loom having, in combination, a weft replenishing mechanism, a filling detector mechanism, a weft hammer coöperating therewith, a thread parter mechanism all located on the same side of the loom, a misthreading device located on the opposite side of the loom and connected with the filling detector mechanism for controlling the operation of the weft replenishing mechanism, and a second weft hammer coöperating with the misthreading device for restoring it to normal condition on the tenth successive beat-up of the lay on the occurrence of a hopper misthread or a real misthread during the weft replenishing operation.

16. An automatic loom having, in combination, a weft replenishing mechanism, a filling detector mechanism, a weft hammer coöperating therewith, a misthreading device connected with the filling detector mechanism for controlling the operations of the weft replenishing mechanism, and a second weft hammer coöperating with the misthreading device for restoring it to normal condition under certain conditions of loom operation, said misthreading device being constructed and arranged to cause loom stoppage on the ninth successive beat-up of the lay on the occurrence of two misthreads during the operation of the weft replenishing mechanism.

17. An automatic loom having, in combination, a weft replenishing mechanism, a filling detector mechanism, a weft hammer coöperating therewith, a thread parter mechanism, all located on the same side of the loom, a misthreading device located on the opposite side of the loom connected with the filling detector mechanism for controlling the operations of the weft replenishing mechanism, and a second weft hammer coöperating with the misthreading device for restoring it to normal condition under certain conditions of loom operation, said misthreading device being constructed and arranged to cause loom stoppage on the ninth successive beat-up of the lay on the occurrence of two misthreads during the operation of the weft replenishing mechanism.

18. An automatic loom having, in combination, a weft replenishing mechanism, a filling detector mechanism, and a misthreading device operatively connected with the filling detector mechanism for controlling the operations of the misthreading device and for restoring normal weaving conditions on the sixth successive beat-up of the lay during a normal operation of the weft replenishing mechanism.

19. An automatic loom having, in combination, a weft replenishing mechanism, a filling detector mechanism, a thread parter mechanism, all located on the same side of the loom, and a misthreading device located on the opposite side of the loom operatively connected with the filling detector mechanism for controlling the operations of the weft replenishing mechanism and for restoring normal weaving conditions on the sixth successive beat-up of the lay during a normal operation of the weft replenishing mechanism.

20. An automatic loom having, in combination, a weft replenishing mechanism, a filling detector mechanism, and a misthreading device connected with the filling detector mechanism for controlling the operations of the weft replenishing mechanism and for restoring normal weaving conditions on the tenth successive beat-up of the lay when a single hopper misthread or a single real misthread occurs during the weft replenishing operation.

21. An automatic loom having, in combination, a weft replenishing mechanism, a filling detector mechanism, a thread parter mechanism, all located on the same side of the loom, and a misthreading device located on the opposite side of the loom connected with the filling detector mechanism for controlling the operations of the weft replenishing mechansm and for restoring normal weaving conditions on the tenth successive beat-up of the lay on the occurrence of a single hopper or a single real misthread during the weft replenishing operation.

22. An automatic loom having, in combination, a weft replenishing mechanism, a filling detector mechanism, and a misthreading device connected with the filling detector mechanism for controlling the operations of the weft replenishing mechanism and on the occurrence of two successive misthreads for causing loom stoppage on the ninth successive beat-up of the lay during the weft replenishing operation.

23. An automatic loom having, in combination, a weft replenishing mechanism, a filling detector mechanism, a thread parter mechanism, all located on the same side of the loom, and a misthreading device located on the opposite side of the loom and connected with the filling detector mechanism for controlling the operations of the weft replenishing mechanism and for causing loom stoppage on the occurrence of two successive misthreads during the weft replenishing operation.

24. A loom having, in combination, a weft replenishing mechanism, a filling detector mechanism located on the same side of the loom with the weft replenishing mechanism, a misthreading device located on the opposite side of the loom constructed and arranged to be controlled in its operations by the filling detector mechanism, and a weft hammer located on the same side of the loom with the misthreading device for resetting it.

25. A loom having, in combination, a weft replenishing mechanism, a filling detector mechanism, both located on the same side of the loom, a misthreading device located on the opposite side of the loom, a weft hammer for coöperating with the filling detector mechanism to actuate the misthreading device, and a second weft hammer located on the opposite side of the loom for initiating the weft replenishing operation.

26. A loom having, in combination, a lay, a weft replenishing mechanism, and a misthreading device for causing loom stoppage on the occurrence of two misthreads, said misthreading device being constructed and arranged to be reset in six successive beat-ups of the lay on a normal operation of the weft replenishing mechanism, to be reset on ten successive beat-ups of the lay on the occurrence of one misthread, and to stop the loom on the occurrence of two misthreads on the ninth successive beat-up of the lay.

27. A loom having, in combination, a lay, a weft replenishing mechanism, a misthreading device for causing loom stoppage on the occurrence of two misthreads, means for actuating the misthreading device on filling absence, and means for resetting the misthreading device to its normal condition after a normal operation of the weft replenishing mechanism on the sixth successive beat-up of the lay during said operation.

28. A loom having, in combination, a weft replenishing mechanism, a misthreading device for stopping the loom on the occurrence of two misthreads, means for actuating the misthreading device when filling is absent, and means for resetting the misthreading device to normal condition on the tenth successive beat-up of the lay during the weft replenishing operation when there has been one misthread.

29. A loom having, in combination, a weft replenishing mechanism, a filling detector mechanism, both located on the same side of the loom, a weft hammer to coöperate with the filling detector mechanism on filling absence, a latch lever on the opposite side of the loom operatively connected with the weft replenishing mechanism, and a weft hammer to coöperate with the latch lever to initiate the weft replenishing operation on the next forward beat of the lay after the detection of filling absence.

30. A loom having, in combination, a weft replenishing mechanism, a filling detector mechanism, both located on the same side of the loom, a latch lever located on the opposite side of the loom, connections between the latch lever and the filling detector mechanism acting to operatively position the latch lever on the detection of filling absence, and a weft hammer to coöperate with the latch lever after it has been operatively positioned to initiate the weft replenishing operation.

31. A loom having, in combination, a lay, a weft replenishing mechanism, a filling detector mechanism, a misthreading device, and two weft hammers operating alternately, the whole being constructed and arranged to detect filling absence on one beat-up of the lay, to initiate the weft replenishing operation on the second beat-up of the lay, and to complete the weft replenishing operation on the third beat-up of the lay.

32. A loom having, in combination, a lay, a weft replenishing mechanism, a thread parter mechanism, a filling detector mechanism, all located on the same side of the loom, and a misthreading device located on the opposite side of the loom operating to cause loom stoppage on the occurrence of either two hopper misthreads or two real misthreads.

33. A loom having, in combination, a weft replenishing mechanism, a filling detector mechanism, a knock-off lever, and a misthreading device comprising a tumbler adapted to actuate the knock-off lever to stop the loom on the occurrence of two misthreads, a tumbler controller connected with the detector mechanism, and a weft hammer for coöperating with the tumbler to restore it to normal position on a normal operation of the weft replenishing mechanism and after the occurrence of one misthread.

34. A loom having, in combination, a weft replenishing mechanism, a filling detector mechanism, a latch lever operatively connected with the weft replenishing mechanism, a weft hammer to coöperate with the latch lever to initiate the replenishing operation on the detection of filling absence, and a misthreading device for controlling the latch lever operatively connected with the filling detector mechanism.

35. An automatic loom having, in combination, a weft replenishing mechanism, a latch lever connected with the replenishing mechanism, a weft hammer to actuate the latch lever, a misthreading device, and a filling detector mechanism including a second weft hammer for actuating the misthreading device on filling absence, said misthreading device being constructed and arranged to cause the latch lever to be positioned in the path of its weft hammer on the occurrence of a filling absence during normal weaving, and to prevent the latch lever from being positioned in the path of its weft hammer on the next succeeding detection of filling absence.

36. An automatic loom having, in combination, a weft replenishing mechanism, knock-off means, a misthreading device, and a filling detector mechanism including a weft hammer for actuating the misthreading device on the occurrence of filling absence, said misthreading device having provision for engagement with the knock-off means to stop the loom on its fifth actuation by the filling detector mechanism.

37. An automatic loom having, in combination, a weft replenishing mechanism, a latch lever connected therewith, a weft hammer to actuate the latch lever, a misthreading device, and a filling detector mechanism including a second weft hammer for actuating the misthreading device on the detection of filling absence, said misthreading device comprising a member connected with the filling detector mechanism adapted to be actuated when filling is absent, and coöperating members adapted to be actuated by the first member to permit the latch lever to be positioned in the path of its weft hammer on each odd numbered filling absence, and to hold the latch lever out of the path of its weft hammer on every even numbered filling absence.

38. An automatic loom having, in combination, a weft replenishing mechanism, a knock-off lever, a filling detector mechanism, both located on the same side of the loom, and a misthreading device located on the opposite side of the loom and connected with the filling detector mechanism to be actuated thereby on filling absence, said misthreading device comprising a knock-off tumbler adapted to engage and actuate the knock-off lever on the occurrence of a predetermined number of misthreads, and a tumbler controller connected with the detector mechanism for actuating the knock-off tumbler.

39. An automatic loom having, in combination, a weft replenishing mechanism, a latch lever connected therewith, a weft hammer to actuate the latch lever, a knock-off lever, a misthreading device, and a filling detector mechanism including a second weft hammer, said misthreading device comprising a latch lever controller, a tumbler for actuating the knock-off lever on the occurrence of a predetermined number of misthreads, and a tumbler controller connected with the detector mechanism, said parts being constructed and arranged to position the latch lever in the path of its weft hammer on each odd numbered detection of filling absence, and to cause loom stoppage on the occurrence of more than a predetermined number of filling absences.

40. An automatic loom having, in combination, a weft replenishing mechanism, a latch lever, connections between the latch lever and the weft replenishing mechanism, a weft hammer to actuate the latch lever, a misthreading device, and a filling detector mechanism including a second weft hammer for actuating the misthreading device on filling absence, said misthreading device having provision for positioning the latch lever in the path of its weft hammer on each odd numbered detection of filling absence, and said misthreading device having further provision for coöperation with the connections between the latch lever and the replenishing mechanism for preventing the latch lever from being positioned in the path of its weft hammer on each even numbered detection of filling absence.

41. An automatic loom having, in combination, a weft replenishing mechanism, a weft hammer, a latch lever connected with the weft replenishing mechanism and constructed and arranged to be engaged and actuated by the weft hammer, and a knock-off lever, said latch lever and said knock-off lever having coöperating parts for preventing an actuation of the replenishing mechanism when the loom is stopped.

42. An automatic loom having, in combination, a weft replenishing mechanism, a filling detector mechanism, and a misthreading device constructed and arranged to cause loom stoppage on the occurrence of a plurality of misthreads, said loom stoppage taking place on the same beat-up of the lay, whether the misthreads are real misthreads or hopper misthreads.

CLARE H. DRAPER.
JONAS NORTHROP.